April 20, 1965
J. P. DUCKWORTH
3,179,501
COUNTERCURRENT NUCLEAR-FUEL LIQUID-LIQUID EXTRACTION APPARATUS
Filed Dec. 14, 1962
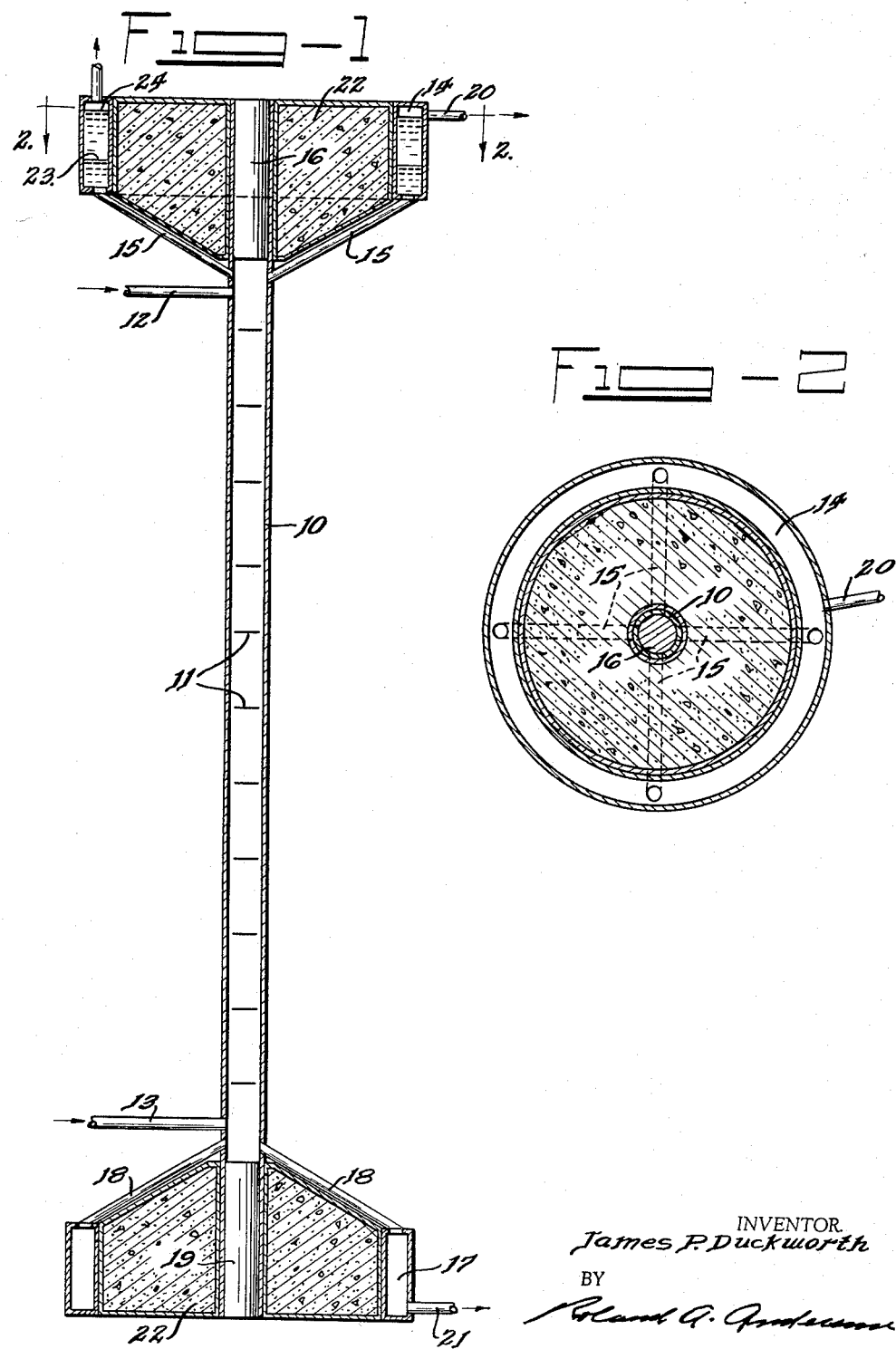
INVENTOR.
James P. Duckworth
BY
Roland G. Anderson
Attorney

3,179,501
COUNTERCURRENT NUCLEAR-FUEL LIQUID-LIQUID EXTRACTION APPARATUS
James P. Duckworth, Richland, Wash., assignor to the United States of America as represented by the United States Atomic Energy Commission
Filed Dec. 14, 1962, Ser. No. 244,847
1 Claim. (Cl. 23—270.5)

The invention relates to a novel apparatus for solvent extraction, more particularly to such an apparatus for the treatment of liquids of potential criticality, characterized by an improved disengaging, or stilling section.

In the processing and reprocessing of nuclear reactor fuel and blanket materials, many processes include the separation of values in solution by means of solvent extraction, or as it is also called, liquid-liquid extraction. This consists of bringing two substantially immiscible liquids into intimate contact, one of an aqueous character, and the other of an organic character; in most processes the organic liquid is lighter than the aqueous liquid, so that they are usually referred to as the light liquid and heavy liquid respectively, but this is not necessarily so, and in some cases it is the organic liquid which is the heavier. However this involves no fundamental difference in the operation of the process.

During the contact between the liquids certain values in one of the liquids, such as uranium, plutonium or fission product values will diffuse across the interface into the other liquid, thereby bringing about a separation of these diffused values from other values remaining in the first mentioned liquid. Examples of solvent extractions involving nuclear materials are to be seen in United States Patents Nos. 2,882,124; 2,883,264; 2,887,355; 3,004,823; 3,047,360; 3,049,402, and elsewhere.

In order that solvent extraction may be carried out at a reasonable rate, it is necessary to increase the area of contact between the aqueous and organic liquids. This is most commonly done by introducing them at opposite ends of an elongated vertical extraction column, the heavy liquid near the top and the light liquid near the bottom; gravity will thereupon cause the two liquids to flow in opposite directions within the column, and in so doing they will commingle and become finely subdivided, thereby greatly enlarging the area of contact between them. The subdividing effect is usually augmented by an array of baffles, or "sieve plates" placed along the length to the column, so as to increase the turbulence of the commingling liquids.

After the upward moving light liquid has passed the point of intake of the heavy liquid, the commingling of the two liquids diminishes; however, the flow of heavy liquid may be controlled in such a way that it rises higher than the point of its introduction, and in any event a certain fraction of the heavy liquid is carried along by the light liquid in the form of entrained droplets. It is, therefore, necessary to provide a space adjacent the top of the column where these may disengage and separate out. This space is known as the disengaging section, or sometimes as the stilling section. A similar section is usually, but not always, placed at the bottom of the column so that entrained droplets of the light liquid may separate out of the heavy liquid.

In the extraction of nuclear fuel or blanket materials such as values of uranium or plutonium, the design of a disengaging section is complicated by the possibility that the masses of materials within them may exceed the dimensions of criticality. This is more commonly at the upper end, but may be at the lower end if the uranium and plutonium values are concentrated there by the process in question. Both the aqueous and the organic liquids are good neutron moderators, and the danger of a nuclear chain reaction being initiated in such masses by stray radiation is always present. In solvent extraction apparatus now in use this danger is avoided by designing the disengaging sections in extremely broad, flat shapes which are located substantially horizontally, or at about right angles to the column; these are known as beaver tails due to their resemblance to the wide, spreading tails of those animals. In addition to the flat design of the disengaging section proper, it has been found necessary, in order to avoid criticality, to make the liquid conduits leading into them quite narrow; in fact, the column itself is required to have a substantial length of reduced diameter just below, or above, as the case may be, the bend in the direction of the substantially horizontal beaver tail.

This arrangement is wasteful of space which is always at a premium in the shielded environment where operations of the kind involved must be carried out due to the radioactive character of the solutions being processed. The beaver tails are anything but compact due to their large horizontal dimensions and disproportionately small vertical dimensions. This unusual configuration also raises problems of support, especially with regard to the section at the upper end of the column. A disadvantage also arises from the fact that since the total length of the column is limited by the vertical dimension of the shielded space in which it is located, the length of its reduced diameter at the top, or bottom, of the column cannot be compensated for in any way and thus represents just so much loss of extractive capacity. A more compact design, which will still avoid the danger of criticality, is therefore highly desirable, particularly with regard to the upper portion of the apparatus.

A further disadvantage of the apparatus just described is that the narrowed sections of the column make it difficult to remove the array of baffles for cleaning purposes or to change the type of baffles when the column is being converted to carry out a different process.

It is, accordingly, the general object of the invention to provide a more compact solvent extraction apparatus for use with potentially critical materials than those now in use.

It is a more particular object to provide a solvent extraction column without portions of reduced diameter adjacent its ends in order to avoid the danger of criticality and to facilitate easy removal of the baffles within the column.

Reference is now made to the drawing, FIG. 1 of which is a sectional side view of the solvent extraction apparatus of the invention; and Referring to FIG. 1, the numeral 10 designates the extraction column proper, of elongated cylindrical shape and in substantially vertical position. It is constructed of some corrosion-resistant material such as stainless steel, it being understood that all other parts of the apparatus are formed of the same, or compatible materials. 11 designates a plurality of horizontal baffles or sieve plates, substantially equally spaced along the inside wall of the column in an array as shown. 12 designates a heavy-liquid inlet adjacent the top of column 10, and 13 designates a light-liquid inlet adjacent its bottom.

Slightly above column 10, or beyond it in the upward direction, is an annular upper vessel 14; it will be observed that in cross-section its height is substantially greater than its width and that it is substantially coaxial with the column 10. It is connected through its nearest flat side with the upper portion of the column 10 by a plurality of radial conduits 15, resembling the spokes of a wheel, as can be seen more clearly in FIG. 2. The conduits 15 extend upwardly and radially outwardly at the same time. It will be understood that the number of conduits is not limited to four as shown in the drawing, but may be any number including being spaced so closely together as to become a single conduit of cone-like conformation.

A removable plug 16, is inserted in the top of the tube forming the column 10 during operation; it extends from the top of the tube to slightly short of the points where the conduits 15 enter the column while it is operating; when it is removed the baffles or sieve plates 11 may be easily withdrawn. It is to be understood that in this application the term "column" designates the part of the tube which is open, and does not include the upper and lower portions occupied by plugs such as the plug 16.

Similarly, below the column 10, or beyond it in the downward direction, is lower annular vessel 17, which is connected through its nearest flat side by a plurality of radial conduits 18 to the bottom portion of the column 10. The conduits 18 extend downwardly and radially outwardly at the same time. A removable plug 19 occupies the bottom part of the tube forming the column 10 to a point just short of the points where the conduits 18 enter the column.

Light-liquid outlet 20 is located in the outer circumference of the upper annular vessel 14 adjacent its top, and heavy-liquid outlet 21 is in the outer circumference of lower annular vessel 17 adjacent its bottom. Within the volumes defined by vessels 14 and 17 and conduits 15 and 18 is shielding concrete 22, which absorbs radiation including neutron radiation, and thereby lessens the danger of a nuclear accident.

In operation the light liquid is introduced into the column 10 through inlet 13, and the heavy liquid is introduced through the inlet 12. The heavy liquid flows in a downward direction and the light liquid flows upward. Sieve plates 11 cause both flows to be somewhat turbulent, and this results in their becoming finely subdivided within each other and greatly increases the area of contact between them.

Referring to FIG. 1, the flows of the two liquids are controlled so that the heavy liquid rises into the bottom of the upper annular vessel 14, and a settled-out interface 23 forms in the lower part of this vessel. The light liquid sits above interface 23 and has an upper level 24 even with the lower part of outlet line 20. The disengaged light liquid leaves by this outlet 20, and the heavy liquid by outlet 21.

*Example*

A solvent extraction apparatus was constructed generally along the lines shown in FIGS. 1 and 2 but with the lower disengaging section including the vessel 17 and the conduits 18, being omitted. The annular vessel 14 was 14" high, 3" wide and the diameter of the inside of the outer curved wall was 3'4". The outside diameter of the inner curved wall was 2'10", all walls being 3/8" thick stainless steel.

The column 10 was made of stainless steel tubing, 34' long, 7" in internal diameter and 1/4" thick, with removable plugs of snugly fitting stainless steel about 18" long on each end.

Four radial conduits 15 connected the column 10 from locations slightly below the plug 16 to the bottom flat side of the upper annular vessel 14. The conduits were equally spaced, or at 90° from each other.

In all other respects the apparatus was provided substantially with the features shown in FIGS. 1 and 2.

An aqueous solution of spent fuel rods from a nuclear reactor dissolved in 6 M aqueous nitric acid was introduced as the heavy liquid through inlet 12. A light liquid consisting of about 1 M tributyl phosphate dissolved in kerosene was introduced at the light liquid inlet 13. A satisfactory extraction of the uranium and plutonium values was made by the light liquid, and neutron monitoring of the area in the vicinity of the annular vessel 14 and the radial conduits 15 indicated a density well within the limits of safety.

It will be understood that this invention is not to be limited to the details given herein, but that it may be modified within the scope of the appended claim.

What is claimed is:

Apparatus for solvent extraction comprising an elongated, cylindrical, vertical column, a heavy liquid inlet adjacent the top of the column, a light-liquid inlet adjacent the bottom of the column, an array of horizontal sieve plates along the length of the column, an upper annular vessel having a rectangular cross-section in the plane passing through the axis of the annular vessel of substantially greater height than width, the said annular vessel having a greater inner diameter than the outer diameter of the column and being coaxial with the column and slightly above its upper end, a first plurality of conduits extending upwardly and radially outwardly from the top portion of the column to equally spaced inlets in the bottom flat side of said rectangle of the cross-sectional shape of the upper annular vessel, a lower annular vessel having a rectangular cross-section in the plane passing through the axis of the annular vessel of substantially greater height than width, the said annular vessel having a greater inner diameter than the outer diameter of the column and being coaxial with the column and slightly below its lower end, a second plurality of conduits extending downwardly and radially outwardly from the bottom portion of the column to equally spaced inlets in the top flat side of said rectangle of the cross-sectional shape of the lower annular vessel, a light-liquid outlet in the outer circumference of said upper annular vessel adjacent its top, a heavy-liquid outlet in the outer circumference of said lower annular vessel adjacent its bottom, removable plugs in each end of the column terminating slightly short of the points where the pluralities of conduits connect with the column, and shielding concrete within the volumes defined by the said annular vessels and pluralities of conduits.

References Cited by the Examiner

UNITED STATES PATENTS

| 2,569,391 | 9/51 | Stearns | 23—270.5 |
| 2,743,170 | 4/56 | Burger | 23—312 X |
| 2,811,423 | 10/57 | Bradley | 23—310 X |
| 2,841,545 | 7/58 | Zinn | 204—154.36 |

FOREIGN PATENTS

| 530,280 | 9/56 | Canada. |

OTHER REFERENCES

Nucleonics, volume 13, No. 6, June 1955, pp. 60–66.

NORMAN YUDKOFF, *Primary Examiner.*